Patented Jan. 19, 1926.

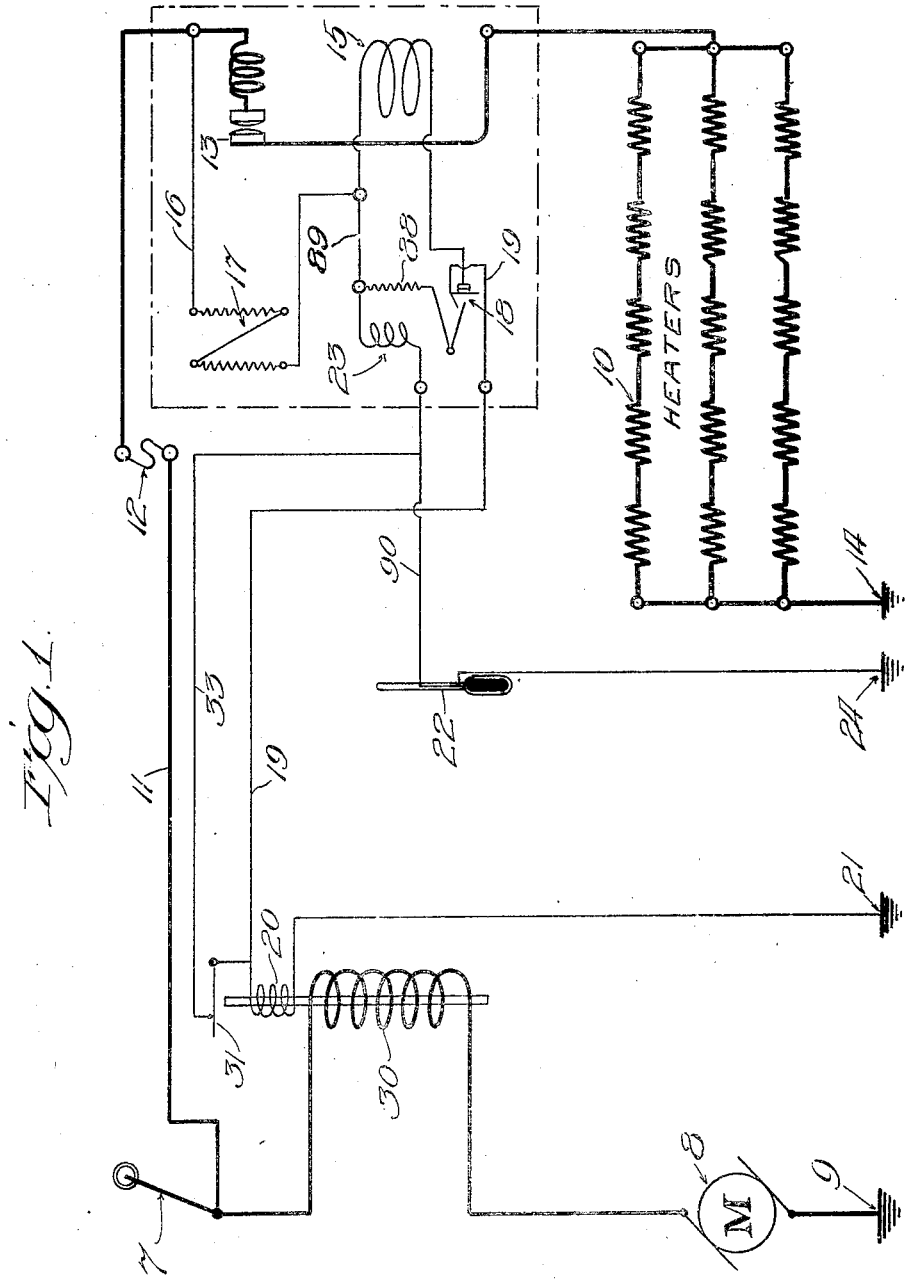

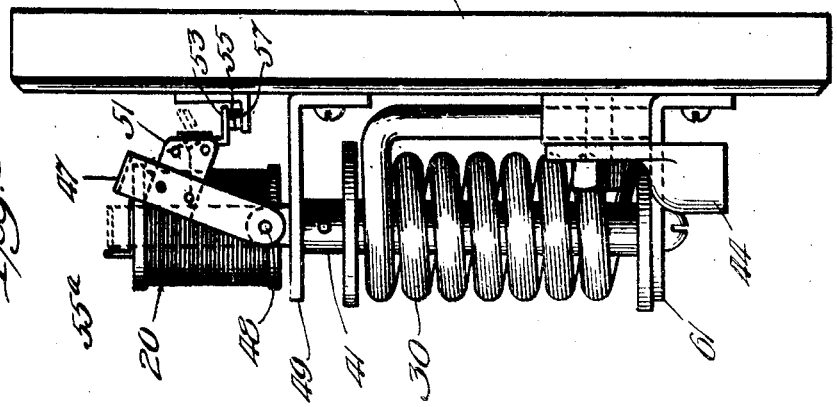
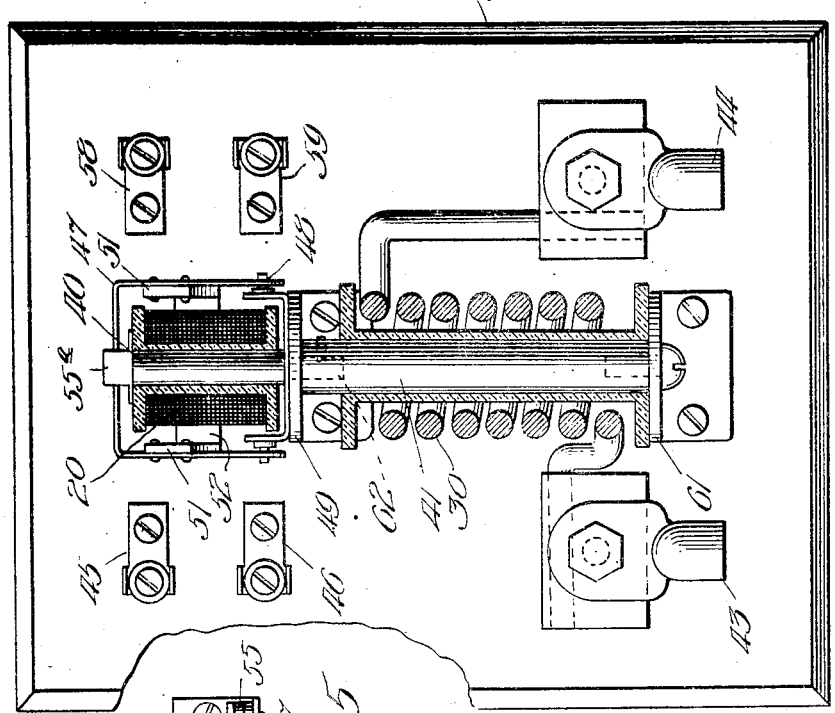

1,569,928

UNITED STATES PATENT OFFICE.

WILLIAM G. HARTWIG, OF CHICAGO, ILLINOIS, ASSIGNOR TO RAILWAY UTILITY COMPANY, OF CHICAGO, ILLINOIS, A CORPORATION OF ILLINOIS.

CAR-HEATING SYSTEM.

Application filed December 10, 1923. Serial No. 679,528.

*To all whom it may concern:*

Be it known that I, WILLIAM G. HARTWIG, a citizen of the United States, residing at Chicago, county of Cook, and State of Illinois, have invented certain new and useful Improvements in Car-Heating Systems, of which the following is a specification.

My invention relates to electric car heating systems such as are used in street cars in which the heating current is taken from the source of operating current. The rate of payment for current for operating street cars depends upon the peak-load, which in the case of the individual car occurs during the coming up to speed particularly on an up-grade. During the rush hours with the cars making many stops and starts which obviously interfere with coasting by which current may be saved the peak-load becomes very high as compared to non-rush hours. My invention has in view the reduction of the peak-load by cutting out the heating current of the individual cars during periods in which the motors are taking the greatest amount of current, as when they are accelerating after a stop and going up an incline with the car loaded. For this purpose I have provided controlling means which, when the motor load reaches a predetermined amperage, will automatically cut out the heating circuit and restore the same when the peak of the load is passed. For example, a medium sized car taking about 80 amperes at full speed on the level will take as much as 300 amperes when starting and during acceleration. The normal heater consumption may run as high as 50 amperes so that the joint load will reach 350 amperes when accelerating. By taking off the heating load during acceleration period the peak-load requirement of current is correspondingly reduced and as the ordinary peak-load is of very short duration the heating of the car does not seriously suffer. Moreover where the consumption of current by the motors is due more or less to the crowding of the car with passengers, their body heat reduces the need of heat furnished by extraneous means.

My invention is of particular value in connection with a thermostatically controlled heating system such as is now commonly used. In such systems the contactor which opens and closes the heating circuit is commonly controlled by a thermostat which opens the heating circuit when the temperature is above that for which the system is designed and closes it when the temperature is lower. My invention provides means for automatically controlling the contactor of such a heating system with respect to the load on the motors of the car, cutting the heat current off when the load on the motors approaches its peak and restoring it after the peak of the load on the motors has passed. At the same time in my improved system, the thermostatic regulation of the heater is unaffected.

In the drawings accompanying and forming a part of this specification I have shown a preferred embodiment of the invention. It is to be understood, however, that the specific disclosure is for the purpose of exemplification only and that the scope of the invention is defined in the following claims in which I have endeavored to cover it as broadly as the state of the prior art will permit.

In the drawing Figure 1 is a diagram of the circuit to which my invention is applied; Fig. 2 a front view, partly in vertical section, of a panel-board with my overload cutout applied thereto; Fig. 3 a side elevation thereof; Fig. 4 a plan, and Fig. 5 a vertical section of a detail.

Referring first to Fig. 1 the trolley of the car as indicated at 7, the motor at 8, and the ground connection from the latter at 9. The heaters 10 receive current from a branch circuit 11 containing a fuse 12 and the contactor 13, the heaters being grounded at 14. The coil 15 of the magnet of the contactor is in a branch circuit comprising wire 16, resistance 17, said coil 19, coil 20 of the over-load cutout and to ground at 21. A relay switch 18, the coil of which is shown at 23 is connected in a short circuit across the terminals of coil 15 comprising wire 88, so that when said switch is closed the contactor is de-energized to open the heating circuit. The coil 23 of said relay is in a circuit comprising wire 89, said coil, wire 90, thermostat 22 and ground 24. When the temperature rises above that for which the system is designed the thermostat closes the circuit through coil 23 and thereby short-circuits the contactor opening the circuit of the heaters, and when the temperature again drops the thermostat opens the circuit of the relay coil 23 and thereby causes the contactor to again close.

My invention relates to means for cutting out the heating circuit irrespective of the temperature during the times when the car motor is taking an excessive amount of current. In the preferred construction a switch 31 is connected across the terminals of the contactor coil as by wire 89, coil 23 of the relay above described, wire 33 and wire 19. The electro-magnet by which the switch 31 is controlled comprises a core, the fine coil 20 to which reference has heretofore been made and a coil consisting of a few turns of the lead from the trolley to the motor, the two coils surrounding the same core and so wound as to oppose each other. The coil 20 constantly receives current when the car is in service, either through the coil 15 of the contactor or through the shunt comprising the resistor 88, the switch 18 and the wire 19, is of sufficient strength to normally hold the switch 31 open when no more than the normal amount of current is flowing through the coil 30. When, however, the motor is heavily loaded as in starting and accelerating and in driving the car up an incline and therefore takes abnormal amperage the magnetization due to coil 30 neutralizes that due to coil 20 and the switch 31 is permitted to close and thereby short-circuit the contactor coil and so open the heating circuit.

Referring now the Figs. 2 to 5, inclusive, showing the construction of the over-load relay it will be observed that the fine coil 20 surrounds a core 40 which is detachable from but magnetically continuous with the core 41 which is surrounded by the coil 30 of coarse wire constituting a portion of the motor circuit. Core 41 is mounted on brackets 61, 49 on the panel board. Core 40 is dowelled thereto at 62. The terminals of the coil 30 are shown at 43, 44, and the terminals of the fine coil at 45, 46. A yoke-shaped armature 47 is pivoted at 48 upon a bracket 49 extending from the panel-board 50 and arranged to swing from the full-line position shown in Fig. 3 which it occupies when the magnetization of the core is neutralized to the dotted line position which it occupies when attracted. Arms 51 are connected to the respective legs of the armature yoke and carry a cross piece 52 of insulating material on which a contact member 53 is swiveled. Said member, which is of conducting material carries at its opposite ends contacts 54, 55, which engage the stationary contacts 56, 57, respectively, the latter being secured to the panel board. From the stationary contacts leads are carried to the binding posts 58, 59, respectively. A stop 55 limits the movement of the armature away from the panel.

Obviously when the magnetization due to the fine coil sufficiently preponderates over that due to the coarse coil the armature of the relay is held in the dotted line position of Fig. 3 and at such times the switch is open at both pairs of contacts. When the heavier coil neutralizes the fine coil, however, the armature and switch drop to the full line position of Fig. 3 closing the circuit at the double contacts, the movable switch member adjusting itself to secure proper contact.

I claim:

1. In an electric system for driving and heating street cars and the like and in combination with the motor and heaters thereof and an electro-magnetic contactor controlling the heating circuit, a switch across the terminals of the contactor coil for short circuiting the latter, an electro-magnetic coil normally holding said switch open, and a coil in the motor circuit adapted to neutralize the first said coil when the load on the motor exceeds a predetermined amount thereby permitting said switch to close.

2. In an electric system for driving and heating street cars and the like and in combination with the motor, heater and motor and heater circuits thereof, a contactor in the heater circuit, an electro-magnet controlling the contactor, a switch in shunt to the coil of the electro-magnet, a thermostat and electro-magnetic coil controlling said switch, a second switch also in shunt to the coil of the contactor, an electro-magnet controlling the same having opposing coils, one of which is constantly energized when the car is in service and the other of which is connected in the motor circuit and so wound as to oppose the first mentioned coil and neutralize it when the motor operates under a predetermined load.

WILLIAM G. HARTWIG.